Dec. 26, 1933.  M. EXELMANS  1,941,079
LIGHTING APPARATUS EMPLOYING RECTILINEAR LIGHT SOURCES
Filed Aug. 23, 1932  5 Sheets-Sheet 1
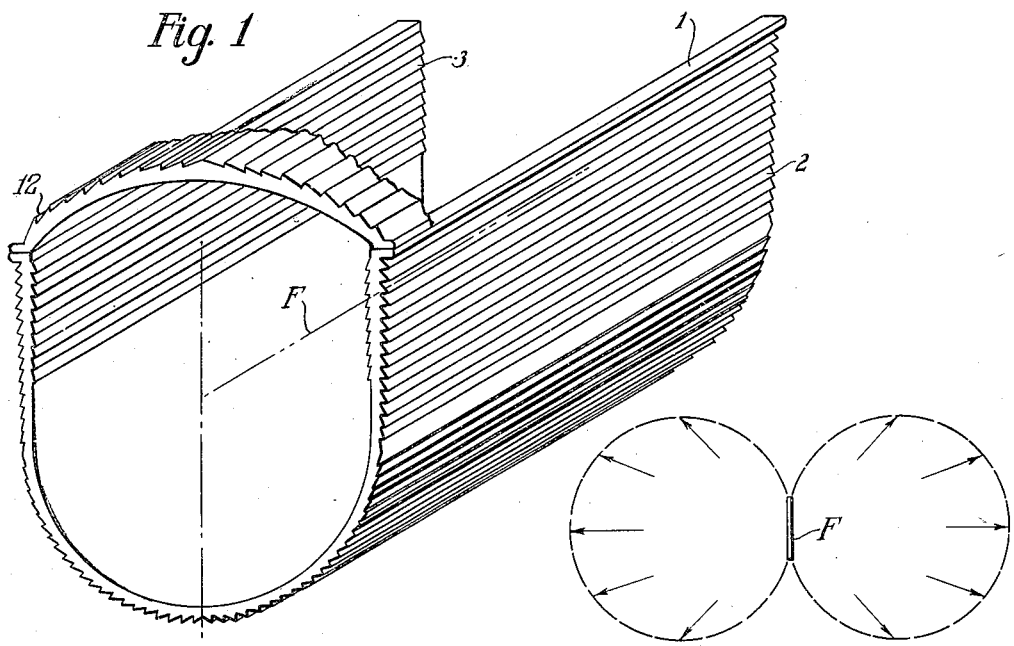
Fig. 1
Fig. 1a
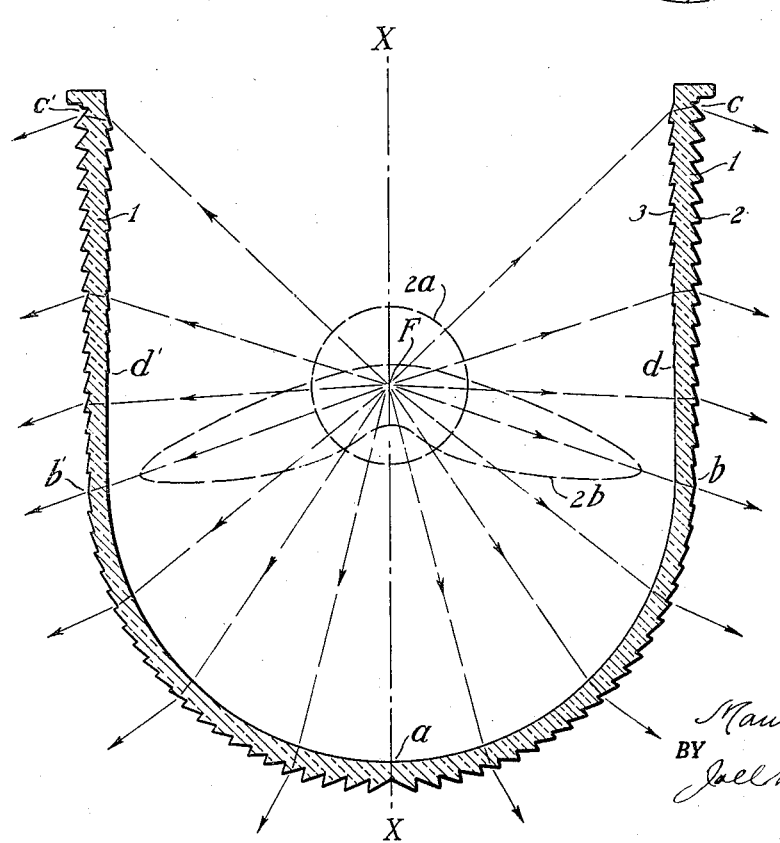
Fig. 2
INVENTOR.
Maurice Exelmans,
BY
Joel B. Hiberman
ATTORNEY.

Dec. 26, 1933.  M. EXELMANS  1,941,079
LIGHTING APPARATUS EMPLOYING RECTILINEAR LIGHT SOURCES
Filed Aug. 23, 1932  5 Sheets-Sheet 2

INVENTOR.
Maurice Exelmans,
BY
Jules Zhiberman
ATTORNEY.

Dec. 26, 1933.  M. EXELMANS  1,941,079

LIGHTING APPARATUS EMPLOYING RECTILINEAR LIGHT SOURCES

Filed Aug. 23, 1932  5 Sheets-Sheet 4

INVENTOR.
Maurice Exelmans,
BY Joel B. Liberman
ATTORNEY.

Dec. 26, 1933.   M. EXELMANS   1,941,079
LIGHTING APPARATUS EMPLOYING RECTILINEAR LIGHT SOURCES
Filed Aug. 23, 1932   5 Sheets-Sheet 5

INVENTOR.
Maurice Exelmans,
BY
ATTORNEY.

Patented Dec. 26, 1933

1,941,079

UNITED STATES PATENT OFFICE 1,941,079

LIGHTING APPARATUS EMPLOYING RECTILINEAR LIGHT SOURCES

Maurice Exelmans, Paris, France, assignor to Holophane Company, Inc., New York, N. Y., a corporation of Delaware Application August 23, 1932, Serial No. 630,006, and in France September 5, 1931

20 Claims. (Cl. 240—106)

The present invention relates to lighting apparatus employing rectilinear light sources and is more particularly directed toward such apparatus having prismatic glassware for altering the light distribution.

Rectilinear light sources have an inherent asymmetric distribution with a maximum intensity in directions perpendicular to the axis of the lamp, the intensity diminishing gradually to practically disappear in the direction of the axis.

The present invention contemplates an asymmetric lighting apparatus designed particularly for outdoor lighting and employing a rectilinear light source consisting either of an incandescent lamp with a rectilinear filament or a luminous tube, and having a refractor adapted to spread part of the light away from an axial plane and to direct another part of the light toward the same, thereby providing two widely divergent flat beams of light for illuminating comparatively narrow extended surfaces.

The light source is placed transversely of the road or street and will of itself give (without any special apparatus) a desirable asymmetric light distribution with maximum intensity in the direction of the road and the minimum toward the sides of the road. It is therefore desirable that the glassware surrounding the lamp should have prisms to modify the distribution of light in the plane perpendicular to the axis of the apparatus so as to send toward the ground rays of light which would otherwise be emitted upwardly. It is also desirable to alter the distribution so as to reduce the intensity of the light underneath the luminair and build up the illumination on the more distant part of the roadway.

Where downward illumination only is desired, the upwardly directed light from the light source is reflected downwardly toward the source so as to be distributed by the lower prisms. Where aerial lighting, sign lighting, or the like is desired, the upwardly directed light is transmitted through a suitable lens.

When one desires to modify the natural asymmetrical characteristics of the source to alter the horizontal photometric curve on one side or the other, or both, the glassware is furnished with a system of prisms modifying the distribution in the horizontal plane in addition to the system of prisms and/or reflectors which modify the distribution in the vertical plane.

Other and further objects of the invention will appear as the description proceeds.

The accompanying drawings show, for purposes of illustrating the present invention, several embodiments in which the invention may take form, it being understood that the drawings are illustrative of the invention rather than limiting the same. In these drawings:

Figs. 1 and 2 show, respectively, in perspective and in vertical section, one of the simplest forms of the invention:

Fig. 1a shows a typical photometric curve of a tubular lamp;

Figure 15:
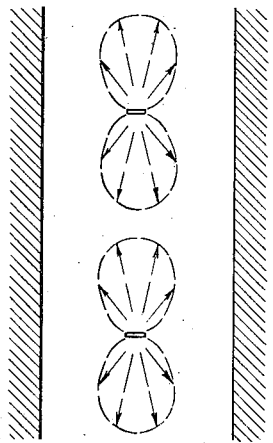
Figure 14:
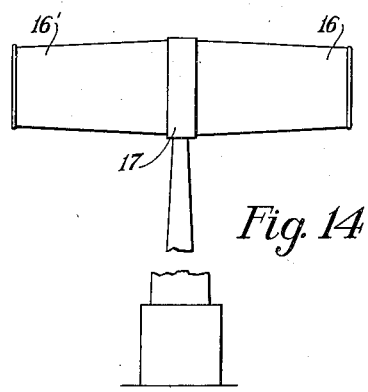
Figure 16:
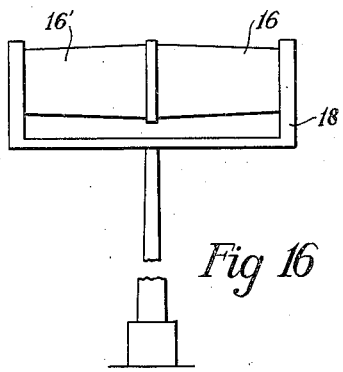
Figure 14B:
Figure 14A:
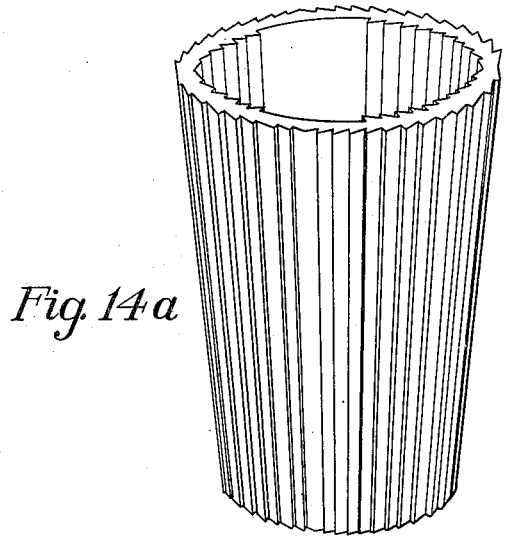
Figure 17:
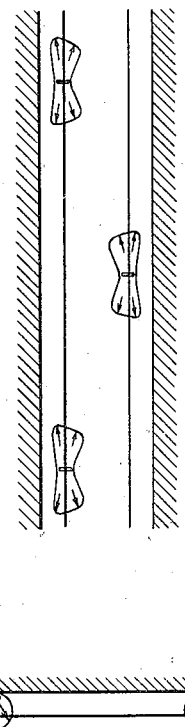

Figs. 6, 7, 8, 9, 10, 11, 12, and 13 show vertical sections through various constructions of glassware;

Fig. 14 is a diagrammatic view showing a form of apparatus designed for street lighting;

Fig. 14a is a perspective view of the refractor of Fig. 14;

Fig. 14b is a perspective view of a longitudinally split refractor;

Fig. 15 illustrates light distributions available by the present apparatus;

Figs. 16 and 17 illustrate modifications of Figs. 14 and 15, respectively; and

Figure 18:
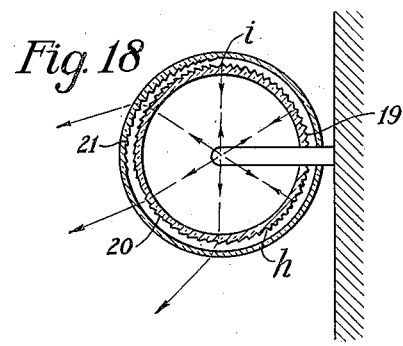
Figure 19:
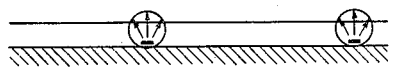

Figs. 18 and 19 illustrate a form of street lighting apparatus adapted for mounting alongside the street.

Figs. 1 and 2 show glassware in the most general form. It consists of a horizontal, semicylindrical prismatic trough 1. A rectilinear source F is disposed along the axis of the trough. This luminous source has a symmetrical distribution in vertical planes and also has a natural asymmetric distribution in the longitudinal plane, as indicated in Fig. 1a. The glassware is furnished with horizontal prisms intended to modify the distribution of light in the vertical plane. These prisms are placed along the entire exterior surface 2, and also on the upper portion of the inner face 3. In the portions a—b and a—b', these prisms spread the light away from nadir. The inclination of these prisms decreases from a to b, so as to decrease the deviation of the rays at greater distances from the axis X—X. In portions b—c, and b'—c', the exterior prisms 2 are inclined in the reverse directions and in the portions c—d and c'—d', the action of the exterior prisms is augmented by that of the interior prisms 3, since it is in this portion that the rays should be most deviated.

The photometric curve of the naked lamp is shown at 2a in Fig. 2 and of the luminair by the curve 2b. The formation of exterior and interior prisms on the same piece of glass makes possible considerable deviation in the luminous rays, which cannot be accomplished with a prismatic globe or hemi-sphere with the usual point light source. Cylindrical glassware, according to the present invention, may be pressed in the form of a plate after which the article can be formed into a trough shape as indicated in Fig. 2 and other figures. By pressing the glass in a plate form, there is no difficulty in putting parallel prisms on both sides of the glass. Then when the glass is formed, these parallel prisms will appear in the final form in the places desired, for example, sections bc and cd and sections b'c' and c'd' of Fig. 2. Such a construction is impossible if glassware like Fig. 2 is pressed to its final shape because the prisms on the inside would prevent the withdrawal of the plunger which forms the article. Providing interior prisms on the present device also allows the use of reflecting prisms which increase the useful flux.

Figure 3:
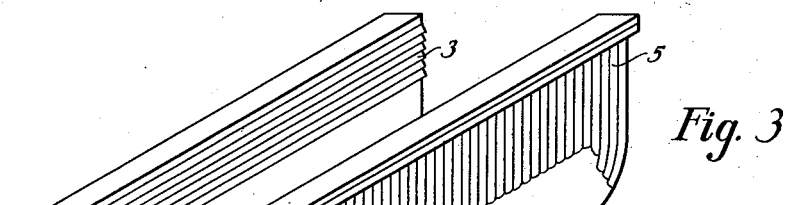
Fig. 3 shows, in perspective, glassware consisting of two envelopes, one having vertical prisms for deviating light in the horizontal plane.

Fig. 3 shows glassware having on a portion of its outer surface vertical prisms 5. Preferably these vertical prisms are placed on a second piece of glassware 6 surrounding glassware 1 which is provided, as previously stated, with horizontal prisms 2 and 3. These vertical prisms are not necessarily placed on the entire surface of the glassware. These vertical prisms are effective to modify the natural asymmetric distributions of the long light source, so that lateral spread may be controlled, for example to narrow the beam and intensify the illumination of distant surfaces.

Figure 5:
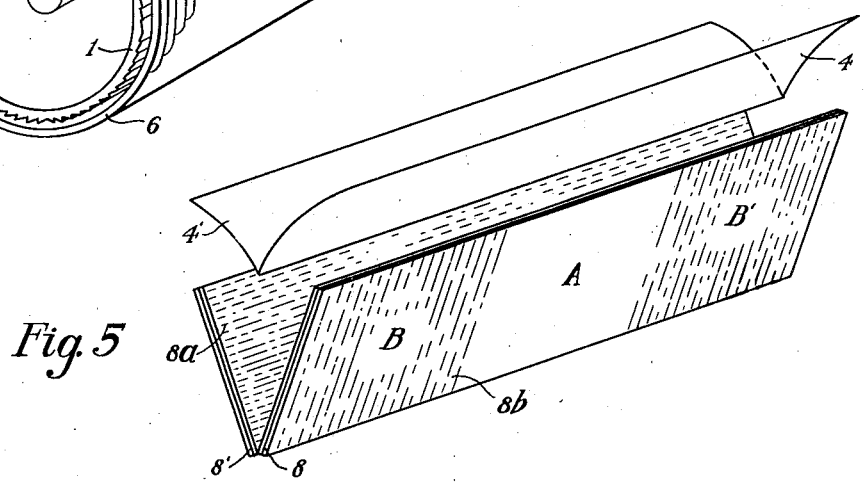
Figs. 4 and 5 show a section and a perspective of another form of glassware with supplemental reflectors for aiding in the vertical distribution of the light and vertical prisms for effecting horizontal distribution.
Figure 4:
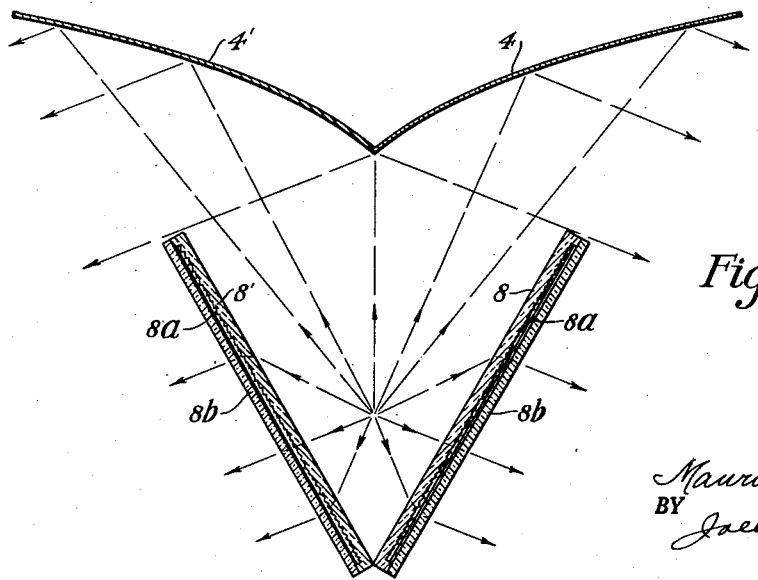

The upper part of the glassware is shown as open in Figs. 1 and 2. The upwardly escaping light may be employed for the lighting of signs or panels, with or without suitable redirecting means. The glass may be covered with various constructions to utilize rays sent upwardly as is shown in the different figures which are hereinafter described. Figs. 4 and 5, for example, show a system of double intercepting reflectors 4 and 4', preferably of parabolic shape and designed to reflect upwardly directed light rays in a useful direction.

In the form shown in Figs. 4 and 5, the trough, instead of being constructed as a semi-cylinder surrounding the source, can be formed of two flat plates 8 and 8' having prisms 8a to direct the light as indicated. Each of these plates is covered by a second plate 8b, as shown in Figs. 4 and 5. These outer plates are composed of a series of distinct elements or zones A, B and B'. Zone A is smooth so as to permit the natural asymmetric distribution of the source to function, and zones B and B' are provided with internal vertical prisms designed to modify the natural asymmetric character of the source. Where the glassware is placed on the side of the street, for example, prisms B' and B can be designed to concentrate toward the surface of the road rays which would otherwise be diverted.

Figure 6:
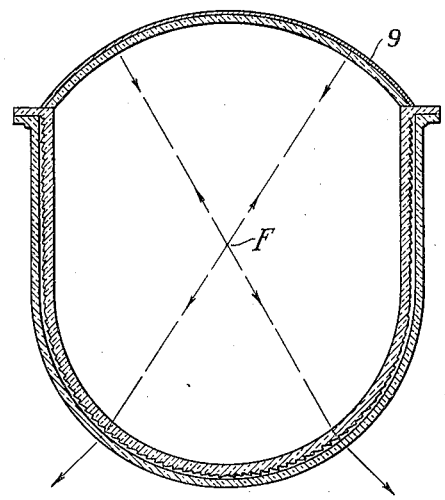
Figure 7:
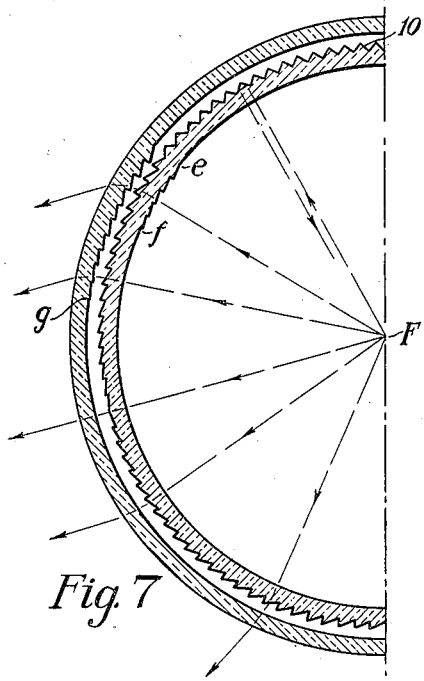

In the forms shown in Figs. 6 and 7, upwardly directed light is returned toward the source by cylindrical reflectors forming part of the apparatus. In Fig. 6, the reflector is shown as being of smooth silvered glass 9, with the same axis as the source F and sending back the rays in their original direction in a plane perpendicular to the filament. In Fig. 7 all the glassware is cylindrical and the reflection or rays otherwise sent upward is obtained by means of total reflecting prisms 10.

Figure 8:
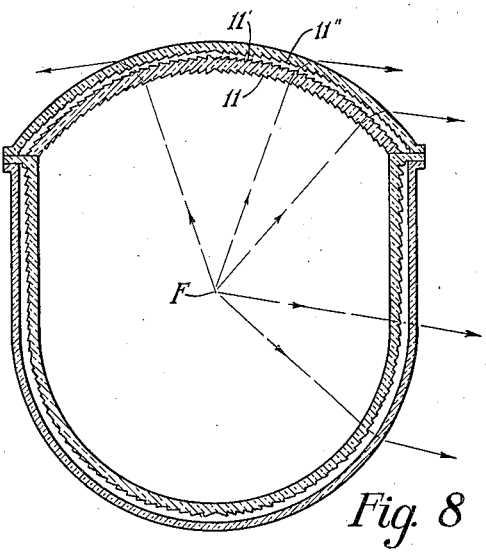

In Fig. 8 a series of refracting prisms 11, 11', 11'' send the rays in useful directions for road lighting.

Figure 9:
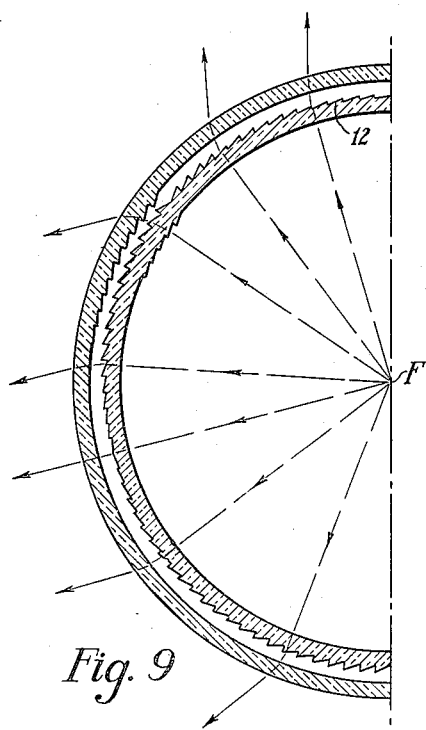

In Fig. 9, on the other hand, the upward rays, instead of being sent toward the ground, are concentrated upwardly by means of prisms 12 to serve as a beacon for aerial routes or for sign lighting. The same reference character (12) is applied to similarly functioning prisms in a trough cover in Fig. 1. These forms of luminair are especially adapted for foggy weather.

Figure 10:
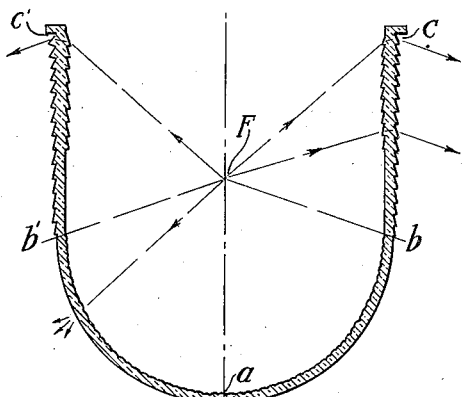

Fig. 10 is a cross-section of a trough which is similar in all respects to the trough shown in Figs. 1 and 2 except that the elevating prisms in the section ab and ab' have been replaced by diffusing flutes. The prisms above the points b and b' produce concentration of light in the general directions Fb and Fb' as in Fig. 2. Below the directions Fb and Fb', however, the light is allowed to escape without change in direction but with slight diffusion produced by the flutes. If desired the flutes may be omitted and the light may be permitted to escape without change; or acid etching, sand blasting or other means may be used to produce slight diffusion.

Figure 11:
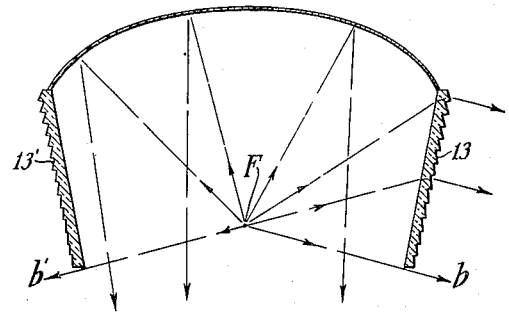

Fig. 11 is a cross-section through another form of apparatus in which the trough construction is replaced by long prismatic plates indicated at 13 and 13'. These run parallel with the light source F and redirect light downward into the direction Fb and Fb'. Light below these angles is allowed to escape without intercepting any light transmitting medium. Above these prismatic plates, a reflector is shown which, in this case, is opaque and redirects light downward through the opening between the lower edges of the two prismatic plates.

Figure 12:
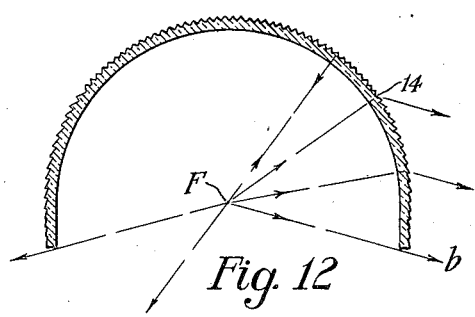

Fig. 12 shows a cross-section of a trough placed with the opening downward instead of upward. Refracting prisms are provided below the point 14 to direct light in the general direction of the beam Fb. Above 14, this trough is provided with reflecting prisms sending the light back upon its course through the light source F.

Figure 13:
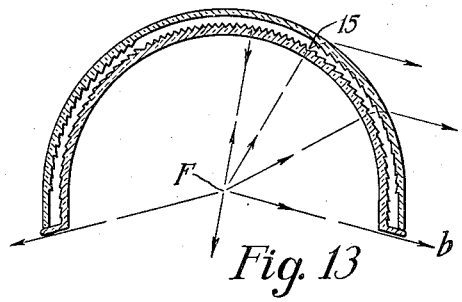

Fig. 13 is constructed on the same principle as Fig. 12. However, the trough is of double thickness and this permits the use of refracting prisms on both pieces. Therefore, the refracting prisms can direct the light into the direction Fb from a higher angle and are carried up to the point 15. Above this point reflecting prisms are used the same as those above the point 14 on Fig. 12.

It should be noted that in Figs. 7, 8, 9, and 13 the apparatus consists of two pieces of glass incased one within the other, and that by providing prisms on each of the four surfaces the solution of light distributing problems is facilitated. In Fig. 7 in particular, it is the inside piece of glass which carries on its outer surface total reflecting prisms 10. From e, where these prisms end, to f, the prisms are provided on three surfaces. The prisms formed on the inner surface of the inside piece vary and are gradually diminished so that the angle of the incident ray is reduced. This construction simplifies mold making as it permits the use of a single tool for the prisms with regard to other surfaces between e and f. After f the interior prisms on the outside piece diminish until they cease to exist at g. From g prisms on the inside piece only are sufficient to produce the desired deviation. Such a construction permits an excellent distribution of light and cannot be obtained with existing lighting glassware.

Fig. 14 shows an apparatus intended to light roadways and to be placed along the center of the road or street, as indicated in Fig. 15. It is constructed of two slightly conical pieces of glass 16 and 16' fastened together end to end by holding means 17. This glassware may be of any of the forms above shown and have internal and/or external prisms as indicated in Fig. 14a. The taper of the glass is somewhat exaggerated in this figure.

Fig. 15 shows, on a small scale, the distribution of the light produced by such apparatus, the natural asymmetric characteristic of the source in horizontal projection not being modified, the apparatus being furnished with horizontal prisms only intended to modify the distribution in the vertical plane.

Fig. 16 shows another method of adjustment in which slightly conical pieces of glassware 16 and 16' are held by their two extremities and by means of a holder 18. Fig. 17 shows another disposition of the apparatus along the road, the different luminous beams being placed laterally and disposed in staggered relation. The light distribution in the horizontal plane is then preferably modified by means of vertical prisms, so as to deviate the two asymmetric curves toward the center of the street. Instead of dividing the glassware vertically, it can, as shown in Fig. 14b, be divided horizontally into half sections and such sections can be placed on top of one another. In this case deviation of light rays may be considerably facilitated owing to the fact that longitudinal prisms can then be placed on the interior and exterior of the glassware. Depending on the dimensions of the apparatus, one can employ a single source or several sources placed end to end.

Fig. 18 shows, in section, a device intended to be fastened against buildings on the roadside, the luminous source being then arranged parallel to the axis of the road as indicated in Fig. 19. The inner glassware is furnished from $h$ to $i$ with totally reflecting prisms 19 and all the rest of the surface with refracting prisms 20, intended to direct light rays toward the center of the road. Exterior glassware is provided also with refracting prisms 21 intended to supplement the action of prisms on the inner glassware. Fig. 19 shows a distribution of this apparatus along the road and the manner in which the luminous beam is directed.

The invention is not intended to be limited according to the devices above shown. It is capable of numerous variations to solve different light problems.

These lighting units are well adapted for producing even illumination on long, narrow surfaces such as streets, corridors, or the like, or for the illumination of artificial sky lights.

What is claimed is:

1. The combination with a rectilinear light source, of a prismatic trough having longitudinal prisms parallel with the light source and symmetrical with respect to an axial plane, the prisms in each zone adjacent the axial plane receiving light through predetermined dihedral angles and spreading it away from said axial plane, the prisms in each of the next adjacent zones receiving light through an adjacent dihedral angle and being of reversed sign so as to direct said light toward the plane separating the dihedral angles.

2. The combination with a rectilinear light source, of a prismatic trough having longitudinal prisms parallel with the light source and symmetrical with respect to an axial plane, the prisms in each zone adjacent the axial plane receiving light through predetermined dihedral angles and spreading it away from said axial plane, the prisms in each of the next adjacent zones receiving light through an adjacent dihedral angle and being of reversed sign so as to direct said light toward the plane separating the dihedral angles, one end portion of the trough having transverse prisms for intercepting the light emitted by the adjacent ends of the light source and directing it toward the central transverse plane of the trough.

3. The combination with a rectilinear light source, of a prismatic trough having longitudinal prisms parallel with the light source and symmetrical with respect to an axial plane, the prisms in each zone adjacent the axial plane receiving light through a predetermined dihedral angle and spreading it away from said axial plane, the prisms in each of the next adjacent zones receiving light through an adjacent dihedral angle and being of reversed sign so as to direct said light toward the plane separating the dihedral angles, and a cylindrical, rectilinear reflector for intercepting the light between said latter mentioned zones and reflecting it back toward the light source.

4. The combination with a rectilinear light source, of a prismatic trough having longitudinal prisms parallel with the light source and symmetrical with respect to an axial plane, the prisms in each zone adjacent the axial plane receiving light through a predetermined dihedral angle and spreading it away from said axial plane, the prisms in each of the next adjacent zones receiving light through an adjacent dihedral angle and being of reversed sign so as to direct said light toward the plane separating the dihedral angles, and supplemental reflectors beyond the open side of the trough for reflecting light into directions generally parallel with the light emitted by said latter mentioned zones.

5. The combination with a rectilinear light source, of a prismatic trough having longitudinal prisms parallel wth the light source and symmetrical with respect to an axial plane, the prisms in each zone adjacent the nadir of the axial plane receiving light through a predetermined dihedral angle and spreading it away from said axial plane, the prisms in each of the next adjacent zones receiving light through an adjacent dihedral angle and being of reversed sign so as to direct said light toward the plane separating the dihedral angles, and a prismatic transmitter intercepting the light between said latter mentioned zones and condensing it into a beam emitted in said axial plane.

6. A luminair for lighting horizontal surfaces comprising an elevated horizontal rectilinear light source and a prismatic trough under the light source having in its lower portion longitudinal prisms for spreading l'ght away from nadir and in its higher portions longitudinal prisms of reversed sign for bending light downwardly below the horizontal to illuminate said surface.

7. A luminair for lighting horizontal surfaces comprising an elevated horizontal rectilinear light source and a prismatic trough under the light source having in its lower portion longitudinal prisms for spreading light away from nadir and in its higher portions longitudinal prisms of reversed sign for bending light downwardly below the horizontal to illuminate said surface, one end portion of the trough having vertical prisms for directing light toward the central transverse plane.

8. A luminair as defined in claim 6 having a cylindrical rectilinear reflector for intercepting light between the refracting zones and reflecting it back toward the light source.

9. A luminair as defined in claim 6, provided with supplemental reflecting surfaces beyond the open side of the trough for reflecting light into directions generally parallel with the light emitted by the prisms in the higher portions of the trough.

10. A luminair as defined in claim 6, having prismatic transmitter intercepting light between the refracting zones and condensing it into a beam directed toward the zenith.

11. A luminair for street lighting or the like, comprising a horizontal rectilinear light source, and a horizontal lens trough underneath the light source and provided with longitudinal prisms on each side of the vertical axis, those above the planes of predetermined vertical angles from nadir transmitting light at a lowered angle toward said plane, those below said vertical angle spreading the light away from nadir and toward said plane.

12. A luminair for street lighting or the like, comprising a horizontal rectilinear light source, and a horizontal lens trough underneath the light source and provided with longitudinal prisms on each side of the vertical axis, those above the planes of predetermined vertical angle from nadir transmitting light at a lowered angle toward said plane, those below said vertical angle spreading the light away from nadir and toward said plane, and transverse prisms crossing the higher longitudinal prisms for reducing the lateral spread of the beam formed thereby.

13. A refractor for rectilinear light sources comprising a prismatic glass member of generally cylindrical shape and having over the major portion of its surface longitudinal light transmitting prisms parallel with the light source for directing light from the light source into two beams asymmetric in a transverse plane.

14. A system of lighting comprising a plurality of spaced light sources above an elongated area to be illuminated, each having symmetrical distribution in vertical planes lengthwise of the area and asymmetrical distributions in transverse radial planes, and a refractor about each light source, the refractor having horizontal prisms for spreading the light emitted in lower angles away from nadir and for directing the light emitted in higher angles toward nadir to increase the illumination of the portions of said area more remote from the light sources.

15. A system of lighting comprising a plurality of spaced light sources above an elongated area to be illuminated, each having symmetrical distribution in vertical planes lengthwise of the area and asymmetrical distributions in transverse radial planes, and a refractor about each light source, the refractor having horizontal prisms for spreading the light emitted in lower angles away from nadir and for directing the light emitted in higher angles toward nadir to increase the illumination of the portions of said area more remote from the light sources, the refractor having vertical prisms across the higher portions thereof for condensing the light into a narrow beam.

16. A system of lighting comprising a plurality of spaced light sources above an elongated area to be illuminated, each having symmetrical distribution in vertical planes lengthwise of the area and asymmetrical distributions in transverse radial planes, and a refractor about each light source, the refractor having horizontal prisms for directing the light emitted above a predetermined angle from the nadir toward this angle to increase the illumination of the portions of said area more remote from the light source.

17. The combination with a rectilinear light source, of a prismatic trough having longitudinal prisms parallel with the light source and symmetrical with respect to an axial plane, the zones adjacent to the axial plane receiving light through predetermined dihedral angles and diffusing this light, the prisms in each of the next adjacent zones receiving light through an adjacent dihedral angle and directing the light toward the plane separating the dihedral angles.

18. The combination with a rectilinear light source, of a prismatic trough having longitudinal prisms parallel with the light source and symmetrical with respect to an axial plane, the prisms in each zone adjacent to the axial plane receiving light through predetermined dihedral angles and reflecting it back through the opening in the trough, the prisms in each of the next adjacent zones receiving light through an adjacent dihedral angle and directing it toward the planes of the light source and the edge of the trough.

19. The combination with a rectilinear light source, of a refractor longitudinally extended parallel with the light source and adapted to intercept and redirect light within certain dihedral angles, these dihedral angles being symmetrical with respect to an axial plane, the prisms in each angle being adapted to direct light toward the plane forming one edge of the dihedral angle.

20. A refractor for rectilinear light sources comprising a prismatic glass member of generally cylindrical shape and having over the major portion of its surface longitudinal light transmitting prisms parallel with the light source for directing light from the light source into a distribution asymmetric in a transverse plane.

MAURICE EXELMANS.